(12) United States Patent
Takahara et al.

(10) Patent No.: US 7,038,852 B2
(45) Date of Patent: May 2, 2006

(54) POLARIZATION CONVERSION OPTICAL SYSTEM AND POLARIZATION CONVERSION ELEMENT

(75) Inventors: Koji Takahara, Amagasaki (JP); Kyu Takada, Otsu (JP); Koujirou Sekine, Ibaraki (JP); Takuji Hatano, Suita (JP)

(73) Assignee: Minolta Co., Ltd., Osaka (JP)

( * ) Notice: Subject to any disclaimer, the term of this patent is extended or adjusted under 35 U.S.C. 154(b) by 506 days.

(21) Appl. No.: 10/003,216

(22) Filed: Dec. 6, 2001

(65) Prior Publication Data

US 2002/0067546 A1   Jun. 6, 2002

(30) Foreign Application Priority Data

Dec. 6, 2000   (JP) .............................. 2000-370952

(51) Int. Cl.
  G02B 27/28   (2006.01)
  G02B 5/30    (2006.01)

(52) U.S. Cl. ...................... 359/487; 359/485; 359/494; 359/498; 359/584; 359/572

(58) Field of Classification Search ................ 350/395; 359/485, 457, 494, 495, 498, 571, 572, 487, 359/584; 353/34

See application file for complete search history.

(56) References Cited

U.S. PATENT DOCUMENTS 4,515,441 A * 5/1985 Wentz .......................... 350/395
5,590,942 A * 1/1997 Kimura et al. ................. 353/34
6,108,131 A * 8/2000 Hansen et al. ............... 359/486
6,278,552 B1   8/2001 Ishihara
6,341,038 B1 * 1/2002 Budd et al. ................... 359/487

FOREIGN PATENT DOCUMENTS

| DE | 0471109 A1 | * | 2/1992 |
| JP | 362200320 A | * | 9/1987 |
| JP | 04-073603 | * | 3/1992 |
| JP | 10197827 | | 7/1998 |
| JP | 2000137194 | | 5/2000 |

* cited by examiner

*Primary Examiner*—Leonidas Boutsikaris
(74) *Attorney, Agent, or Firm*—Buchanan Ingersoll PC

(57) ABSTRACT

A polarization conversion optical system converts light having a nonuniform plane of polarization into light having a uniform plane of polarization. The system includes a multilayer dielectric film at the side upon which the target light is incident. The film exhibits the property that it reflects one polarized component of the light and transmits a second polarized component of the light at a first angle of incidence, but transmits the first component at a second angle of incidence. Incident target light that is transmitted through the film at the first angle of incidence passes through a quarter-wavelength plate and is reflected at the second angle, whereupon it is retransmitted through the quarter-wavelength plate to be converted from one plane of polarization to the other. It is then emitted from the dielectric film in the same plane of polarization as light reflected by the film.

18 Claims, 6 Drawing Sheets

POLARIZATION CONVERSION OPTICAL SYSTEM AND POLARIZATION CONVERSION ELEMENT

RELATED APPLICATION

This application is based on Patent Application No. 2000-370952 filed in Japan, the content of which is hereby incorporated by reference.

BACKGROUND OF THE INVENTION

1. Field of the Invention

The present invention relates to a polarization conversion optical system for converting light having a nonuniform plane of polarization to light having a uniform plane of polarization, and a polarization conversion element integrating the polarization conversion optical system in a single element.

2. Description of the Related Art

In optical devices using direct polarized light having a uniform plane of polarization, light having a nonuniform plane of polarization is converted to light having a uniform plane of polarization to increase the efficient use of the light. For example, in a projection image display device which modulates illumination light by a liquid crystal display device, nonpolarized light emitted from the lamp of a light source is converted to light having a uniform plane of polarization, and the converted light is directed to a liquid crystal display as illumination light to provide a bright projection image.

FIG. 10 shows a representative structure of a polarization conversion optical system for converting light having a nonuniform plane of polarization to light having a uniform plane of polarization. The polarization conversion optical system 50 comprises a polarization beam splitter (PBS) prism 51, half-wavelength plate 52, and mirror 53. The PBS prism 51 is produced by interposing a polarization beam-splitting film 51a between two triangular prisms. The polarization beam-splitting film 51a is a dielectric multilayer film set so as to transmit a p-polarized light component and reflect an s-polarized light component, thereby separating the p-polarized light component and s-polarized light component of mutually intersecting planes of polarization.

The half-wavelength plate 52 is disposed in the optical path of either of the linear polarized light of the separated p-polarized light component or the linear polarized light of the s-polarized light component, such that the plane of polarization of the impinging linear polarized light is rotated 90° to match the plane of polarization of the other linear polarized light. FIG. 10 shows a case wherein the p-polarized light component is transformed into an s-polarized light component relative to the polarization beam-splitting film 51a.

Polarization beam splitting may be accomplished by using a PBS prism with an adhered doubly refracting crystal, rather than a PBS prism provided with a polarization beam-splitting film, in a polarization conversion optical system wherein the plane of polarization of one separated linear polarized light is rotated by a half-wavelength plate.

In recent years, polarization conversion optical systems have been proposed wherein polarization beam splitting is accomplished using a birefringent diffraction grating, and the plane of polarization is made uniform by a half-wavelength plate (e.g., Japanese Laid-Open Patent Application Nos. H10-197827, 2000-137194). The birefringent diffraction grating accomplishes polarization beam splitting by using the difference in the diffraction efficiency of the diffraction grating relative to the two polarized light components of mutually intersecting planes of polarization.

The structure of a birefringent diffraction grating is shown in FIG. 11. A birefringent diffraction grating 61 is produced by interposing a birefringent material 62 such as a liquid crystal having birefringence between a flat plate-like member 64 and a plate-like member 63 having a diffraction grating 63 formed thereon. The refractive indices of the birefringent material 62 and the member 63 are set so as to be equal relative to normal light o, and the refractive indices of the birefringent material 62 and the member 63 are different relative to abnormal light e. Accordingly, abnormal light e is diffracted and deflected by the diffraction grating 63a, and normal light o is not diffracted and advances rectilinearly. In this way both polarized light components are separated.

Both of the aforesaid polarization conversion optical systems are capable of setting the entirety of the polarized light to linearly polarized light having a uniform plane of polarization, whatever the polarization state of the conversion target light. Accordingly, optical devices provided with these polarization conversion optical systems are much more efficient at using light from a light source.

Both of these polarization conversion optical systems have a problem in that it is difficult to make them compact. In the polarization conversion optical system 50 shown in FIG. 10, since polarized beam splitting is accomplished by a regular quadrilateral pyramid-shaped PBS prism 51, the size in the direction along the beam prior to conversion is greater than the beam diameter. Since, directly after splitting, the two linear polarized light components advance in mutually perpendicular directions, a mirror is required to bend one of the optical paths, and the size in the direction perpendicular to the light beam is more than double the beam diameter.

In a polarization conversion optical system using a PBS prism with an adhered doubly refracting crystal and a polarization conversion optical system using the birefringent diffraction grating shown in FIG. 11, the size in the direction along the beam prior to conversion is larger than the polarization conversion optical system 50. Although the element used to split the polarized light is a thin element, there is no great angular difference in the direction of travel of the beams of the two polarized light components that pass through the element, such that a long optical path is required for complete separation of both polarized light components. The size in a direction perpendicular to the beams prior to conversion is more than double the beam diameter.

These polarization conversion optical systems using birefringence can be made compact to a certain degree if assembled with a micro lens array. As an example, FIG. 12 shows the structure of a polarization conversion optical system 60 in which a micro lens array 65 is combined with the birefringent diffraction grating 61 of FIG. 11. The micro lens array 65 is adhered to the exit surface of the birefringent diffraction grating 61, such that light transmitted through the birefringent diffraction grating 61 is condensed to individual convergent beams by the micro lenses 65a. The two polarized light components having different directions of travel converge at different positions, and are split at an early stage due to the convergent beams. A half-wavelength plate 66 is divided into equal numbers with the micro lenses 65a, which are arranged near the convergence position of the beam of one polarized light component.

In the polarization conversion optical system 60, the size in a direction perpendicular to the light beam prior to conversion is less than double the beam diameter, and the size in a direction along the light beam prior to conversion is also smaller. However, a half-wavelength plate 66 must be disposed at a position approximately a beam diameter from the micro lens array 65, thereby limiting the compactness of the entire optical system. Moreover, the assembly process becomes complex because the relative positions of the micro lens array 65 and the half-wavelength plate 66 must be precisely set.

In polarization conversion optical systems using a PBS prism with an adhered doubly refracting crystal, there are disadvantages relating to production characteristics because the doubly refracting crystal is expensive, and the process of adhering the doubly refracting crystal is complex.

SUMMARY

In view of these disadvantages, an object of the present invention is to provide a polarization conversion optical system and polarization conversion element which is compact and easily manufactured.

These objects are attained by a polarization conversion optical system of the present invention for converting light having a nonuniform plane of polarization to light having a uniform plane of polarization, comprising a dielectric multilayer film having a different incidence angle dependency relative to a first polarized light component and a second polarized light component which have mutually intersecting planes of polarization, so as to transmit the first polarized light component and transmit the second polarized light component at a first incidence angle, and transmit the second polarized light component at a second incidence angle; a reflecting element for reflecting light entering the dielectric multilayer film at a first incidence angle and transmitted through the dielectric multilayer film so as to impinge the dielectric multilayer film at a second incidence angle; and a quarter-wavelength plate positioned medially to the dielectric multilayer film and the reflecting element.

In the polarization conversion optical system, the target of polarization conversion light enters from the dielectric multilayer film side and exits at the dielectric multilayer film side. Among light entering the dielectric multilayer film at a first incidence angle, a second polarized light component is reflected by the dielectric multilayer film and a first polarized light is transmitted through the dielectric multilayer film and enters a quarter-wavelength plate. The first polarized light component becomes linearly polarized light when entering the quarter-wavelength plate, and becomes circularly polarized light by passing through the quarter-wavelength plate. The circularly polarized light reaches a reflecting element and is reflected. The reflected circularly polarized light again passes through the quarter-wavelength plate and becomes linear light having a plane of polarization rotated 90°, i.e., becomes the second polarized light component, and again enters the dielectric multilayer film.

Since the reflecting element reflects light such that the incidence angle to the dielectric multilayer film becomes a second incidence angle, the second polarized light component is transmitted so as to re-enter the dielectric multilayer film. Accordingly, the polarized light component initially transmitted through the dielectric multilayer film is emitted from the dielectric multilayer film as a second polarized light component identical to the component initially reflected by the dielectric multilayer film, such that light having a nonuniform plane of polarization is converted to light having a uniform plane of polarization.

Whether or not the dielectric multilayer film and the reflecting element are separated from the quarter-wavelength plate has no effect on the previously described action. That is, the dielectric multilayer film and the reflecting element may be in contact with the quarter-wavelength plate; in this way, a compact polarization conversion optical system can be realized.

The reflecting element may be a reflecting-type diffraction element. A reflecting-type diffraction element is different from a normal reflecting element such as a mirror and the like which provide direct reflection, and the reflection angle can be set differently from the incidence angle. Accordingly, since the light entering at a first incidence angle and transmitted through the dielectric multilayer film re-enters the dielectric multilayer film at a second incidence angle, the diffraction element need not be inclined relative to the dielectric multilayer film, and may be arranged parallel thereto. When the diffraction element is arranged parallel to the dielectric multilayer film, the thickness of the light beam does not increase no matter how large the light beam which is the target of polarization conversion, and the optical system can be reliably compact.

The transmittance of the first polarized light component at a first incidence angle of the dielectric multilayer film may be 99% or higher, and the reflectivity of the second polarized light component at the first incidence angle may be 99% or higher, and the transmittance of the second polarized light component at the second incidence angle may be 95% or higher. In this way, loss is greatly suppressed, and the light is not contaminated by polarized light components having different planes of polarization, whatever the polarization state of the light.

Furthermore, the difference between the first incidence angle and the second incidence angle may be 30° or less. For the second polarized light component exiting from the dielectric multilayer film, the different direction of travel depends only on the difference between the first incidence angle and the second incidence angle. By setting this angular difference at 30° or less, managing the converted light by other optical elements and optical systems becomes easy.

These objects are attained by a polarization conversion optical system using a reflecting element structured as a reflecting-type diffraction element of the present invention, wherein the dielectric multilayer film, quarter-wavelength plate, and diffraction element are integrally formed as a polarization conversion element. Since the diffraction element may be disposed parallel to the dielectric multilayer film, the element may be a thin plate-like element. Since a single element is used, there is no need to adjust the relative angles of the dielectric multilayer film and diffraction element after they have been mounted.

A substrate may be provided between the dielectric multilayer film and the quarter-wavelength plate, or between the quarter-wavelength plate and the diffraction element. The substrate does not participate in the polarization conversion function, however, providing the substrate provides easy support of the mounting of the other structural element and supports the shape of the polarization conversion element.

Use of a diffraction grating as the diffraction element is simple. In this case, a plate-like member may have the diffraction grating formed on its surface and may be used as the diffraction element, the diffraction grating may be formed on the surface of the quarter-wavelength plate, and part of the surface of the quarter-wavelength plate may function as a diffraction grating.

BRIEF DESCRIPTION OF THE DRAWINGS

These and other objects and features of this invention will become clear from the following description taken in conjunction with the preferred embodiments with reference to the accompanying drawings, in which.

DESCRIPTION OF THE PREFERRED EMBODIMENTS

Figure 1:
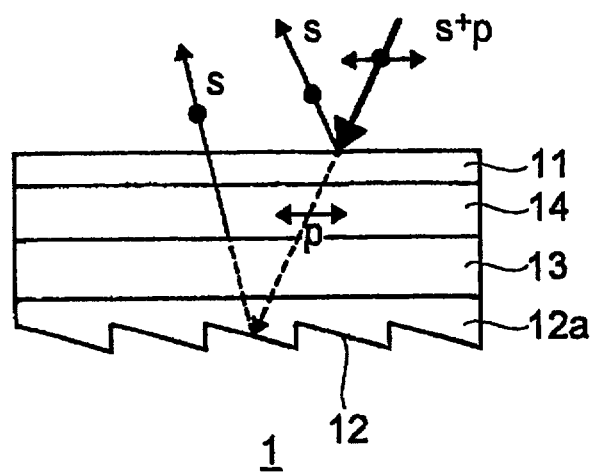
FIG. 1 is a cross section view schematically showing the structure of a first embodiment of the polarization conversion element, and the principle of polarization conversion.

The polarization conversion optical system of the present invention is described hereinafter by way of embodiments of a single element, i.e., a polarization conversion element, in conjunction with the accompanying drawings. The structure of a first embodiment of the polarization conversion element 1 is shown schematically in FIG. 1. The polarization conversion element 1 is provided with a dielectric multilayer film 11, diffraction grating 12, quarter-wavelength plate 13, and substrate 14.

The dielectric multilayer film 11 is provided on the surface of the substrate 14, and is produced by laminating layers of a plurality of dielectrics having different refractive indices. The dielectric multilayer film 11 has an incidence angle dependency of variable light transmittance and reflectivity depending on the incidence angle, i.e., the incidence angle dependency of the p-polarized light and the dependency of the s-polarized light are set so as to be different.

The diffraction grating 12 is formed on the surface of a plate-like member 12a. The diffraction grating 12 is set so as to diffract reflected light while reflecting the light entering the polarization conversion element from the side of the member 12a. The member 12a on which is formed the diffraction grating 12 is a reflecting-type diffraction element.

The quarter-wavelength plate 13 is adhered to the substrate 14, and the member 12a is adhered to the quarter-wavelength plate 13. Any of the members 12a, quarter-wavelength plate 13, and substrate 14 may be flat plates, and may be mutually parallel. Although the structural elements may be integrated by gluing, the structural elements may be integrated by inserting the peripheral part from the dielectric multilayer film 11 side and from the member 12a side.

In the polarization conversion element 1, the polarization conversion target light enters from the dielectric multilayer film 11 side, and converted light exits from the dielectric multilayer film 11 side. Specifically, the transmitted p-polarized light component and the s-polarized light component of the conversion target light are split by the dielectric multilayer film 11, the transmitted s-polarized light component is reflected, the p-polarized light component is separated, the transmitted p-polarized light component is converted to circularly polarized light by the quarter-wavelength plate 13, this circularly polarized light is reflected by the diffraction grating 12, the reflected circularly polarized light has its plane of polarization rotated 90° by the quarter-wavelength plate 13, and becomes an s-polarized light component. Then, the s-polarized light re-enters the dielectric multilayer film 11 and is transmitted therethrough, as explained hereinafter, and exits together with the initially reflected s-polarized light.

Figure 2:
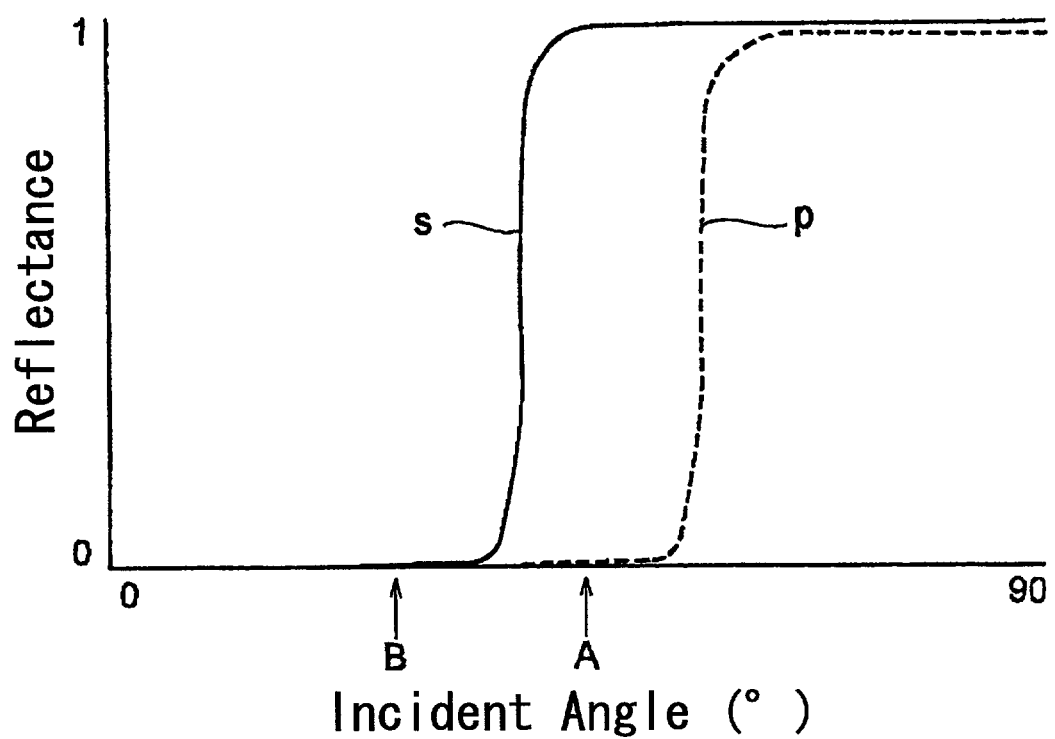
FIG. 2 shows the typical relationship of the reflectivity of the dielectric multilayer film relative to p-polarized light and s-polarized light and the incidence angle to the dielectric multilayer film of the polarization conversion element of each embodiment.

The beam splitting by the dielectric multilayer film 11, and the principle of the emitted converted polarized light are described below with reference to FIG. 2. This figure shows the typical relationship of the reflectivity of the dielectric multilayer film relative to p-polarized light and s-polarized light and the incidence angle to the dielectric multilayer film. Transmittance and reflectivity have a correspondence such that transmittance plus reflectivity equal [1]. The dielectric multilayer film 11 is set such that transmittance is high relative to both p-polarized light and s-polarized light when the incidence angle is small, and the reflectivity is high relative to both p-polarized light and s-polarized light when the incidence angle is large, and transmittance is high for p-polarized light and reflectivity is high for s-polarized light when the incidence angle is intermediate.

The polarization conversion target light impinges the dielectric multilayer film 11 at a specific first incidence angle A. The incidence angle A is within a range of high transmittance relative to the p-polarized light, and high reflectivity relative to the s-polarized light. Furthermore, light coming from the quarter-wavelength plate 13 to the dielectric multilayer film 11 impinges at a specific second incidence angle B. The incidence angle B is within a range of high transmittance relative to the s-polarized light. In this way, it is possible for the dielectric multilayer film 11 to both split the p-polarized light and s-polarized light, and to transmit the s-polarized light converted from p-polarized light.

The diffraction grating 12 does not directly reflect the light entering the dielectric multilayer film 11 at the incidence angle A and transmitted therethrough, and the diffraction conditions are set so as to cause such light to reenter the dielectric multilayer film 11 at the incidence angle B. The diffraction conditions are easily determined by considering the refractive indices and thickness of the substrate 14, quarter-wavelength plate 13, and member 12a, in addition to the incidence angles A and B.

Figure 3:
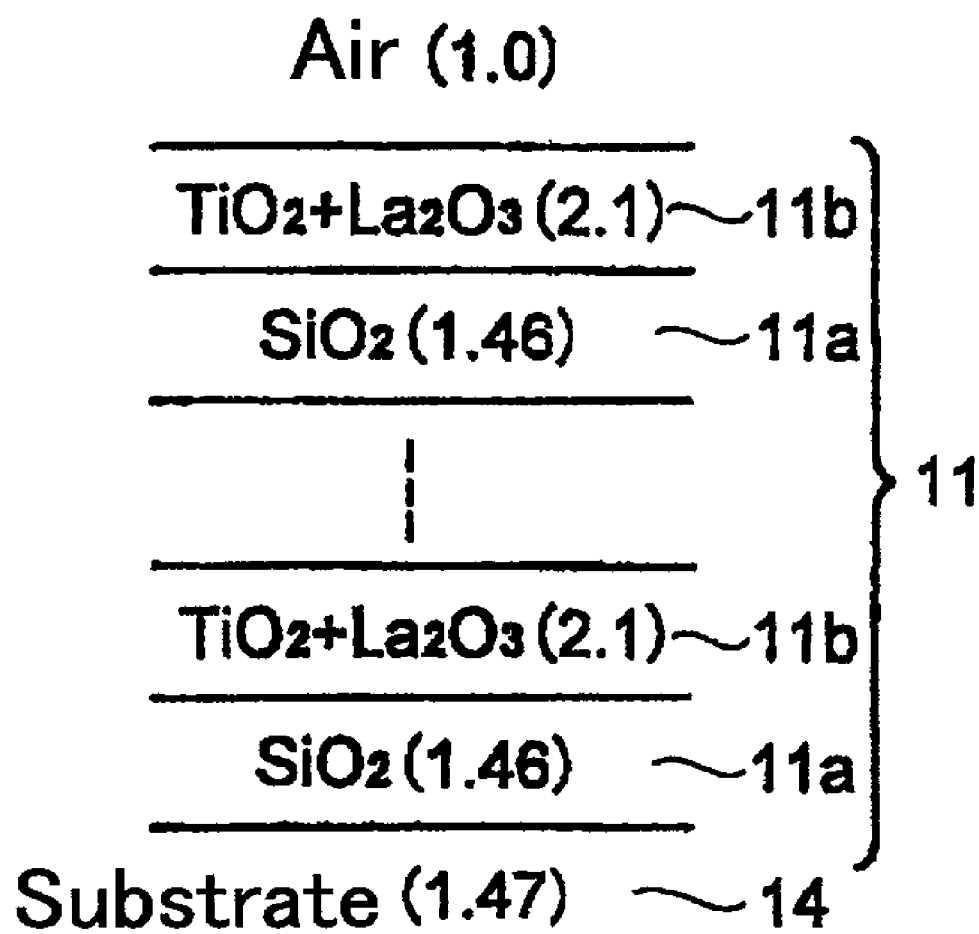
FIG. 3 is a cross section view schematically showing a specific structural example of the dielectric multilayer film of the polarization conversion element of each embodiment.

An example of the specific structure of the dielectric multilayer film 11 is shown in FIG. 3. This example provides a total of 32 mutually alternating layers of dielectric layer 11a having a refractive index of 1.46 and comprised of $SiO_2$, and dielectric layer 11b having a refractive index of 2.1 and comprised of $TiO_2$ and $La_2O_3$ superimposed on a glass substrate 12 having a refractive index of 1.47. When the refractive index is represented by n, the thickness of the dielectric layers 11a and 11b is 1/4n of the wavelength of the polarization conversion target light.

Figure 4:
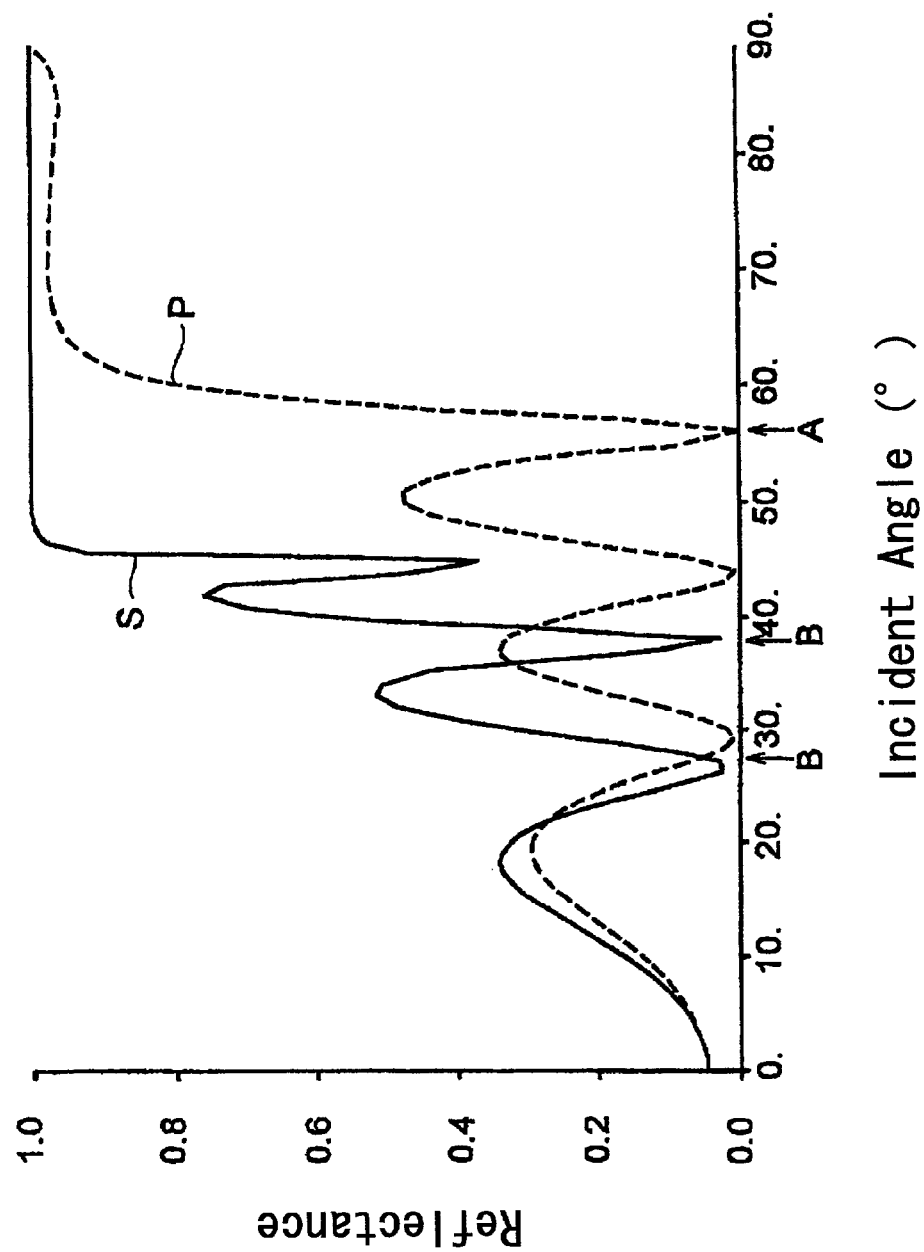
FIG. 4 shows the relationship of the reflectivity of the dielectric multilayer film relative to the p-polarized light and s-polarized light and the incidence angle to the dielectric multilayer film of each construction.
Figure 5:
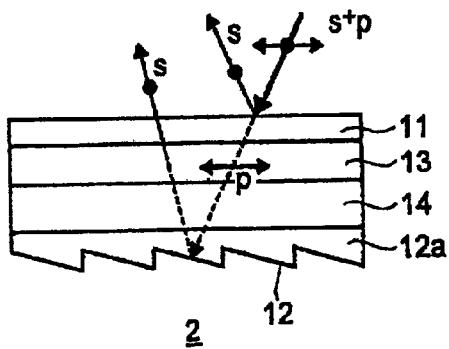
FIG. 5 is a cross section view schematically showing the structure of a second embodiment of the polarization conversion element, and the principle of polarization conversion.
Figure 6:
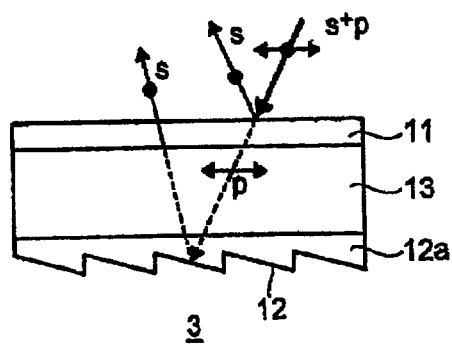
FIG. 6 is a cross section view schematically showing the structure of a third embodiment of the polarization conversion element, and the principle of polarization conversion.

The relationship of the reflectivity of the dielectric multilayer film relative to the p-polarized light and s-polarized light and the incidence angle to the dielectric multilayer film of FIG. 3 is shown in FIG. 4. In this case, the incidence angle A of the conversion target light to the dielectric multilayer film 11 is 56.5°, the incidence angle B of the converted light to the dielectric multilayer film 11 is 27.5°, or 38.0°. At the incidence angle 56.5°, the transmittance of p-polarized light is 99.5% or higher, and reflectivity of s-polarized light is 99.5%. At the incidence angle 27.5°, transmittance of s-polarized light is 95.3%, and at incidence angle 38.0°, transmittance of s-polarized light is 97.6%.

In order to increase the polarization efficiency (i.e., the ratio of the intensity of the s-polarized light included in the converted light relative to the intensity of the light prior to conversion), it is desirable that the transmittance of the p-polarized light at incidence angle A is 99% or higher, the reflectivity of s-polarized light at incidence angle A is 99% or higher, and the transmittance of s-polarized light at incidence angle B is 95% or higher. When nonpolarized light is targeted for polarization conversion at this setting, the polarization conversion efficiency is 96.5% or higher.

Based on the characteristics of the dielectric multilayer film 11 shown in FIG. 4, when incidence angles A and B are respectively set at 56.5° and 27.5°, the polarization conversion efficiency is 97.1% or higher when nonpolarized light is the target. Furthermore, when incidence angles A and B are respectively set at 56.5° and 38.0°, the polarization conversion efficiency is 98.3% or higher. Practically, since the diffraction efficiency is also influenced by the diffraction grating 12, the polarization conversion efficiency is slightly lower than the calculated value, however, the polarization conversion element 1 can accomplish polarization conversion with excellent efficiency.

Although there is a possibility that the purity of the converted light may be affected by the high transmittance of the p-polarized light at incidence angle B when re-entering the dielectric multilayer film 11, there is virtually no problem if the reflectivity is high relative to the s-polarized light at incidence angle A. For example, if the reflectivity of s-polarized light at incidence angle A is 99%, p-polarized light generated by conversion is only 1%. The reason for this is that the transmittance of p-polarized light is not only 4.7% when incidence angle B is 27.5°, the transmittance of p-polarized light is approximately 33% when incidence angle B is 38.0°.

Although s-polarized light from prior to conversion among s-polarized light exiting from the polarization conversion element 1 is contained in the s-polarized light after conversion, the generated angular difference is equal to the difference in the incidence angle A and incidence angle B in the optical paths of the former and latter. Since it becomes difficult to manage the converted light with other optical systems and optical elements when the angular difference is large, it is desirable that the difference in the incidence angle A and incidence angle B is kept as small as possible. At the previously mentioned settings, the difference in the incidence angle A and incidence angle B is 29° and 18.5°, and subsequent handling is easy. In this way, the difference in the incidence angle A and incidence angle B is 30° or less.

The structures of polarization conversion elements 2~5 of the second through fifth embodiments which are modifications of the polarization conversion element 1 are shown schematically in FIGS. 5~8. A polarization conversion element 2 of a second embodiment shown in FIG. 5 reverses the positions of the quarter-wavelength plate 13 and the substrate 14, and the polarization conversion element 3 of a third embodiment shown in FIG. 6 omits the substrate 14. In both polarization conversion elements 2 and 3, the dielectric multilayer film 11 is provided on the surface of the quarter-wavelength plate 13.

Figure 7:
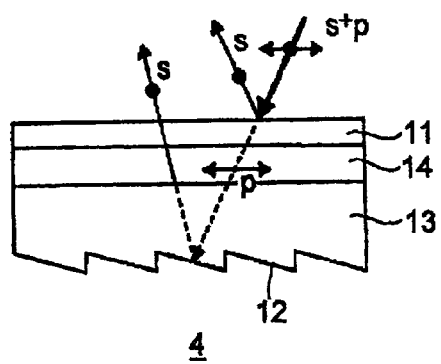
FIG. 7 is a cross section view schematically showing the structure of a fourth embodiment of the polarization conversion element, and the principle of polarization conversion.
Figure 8:
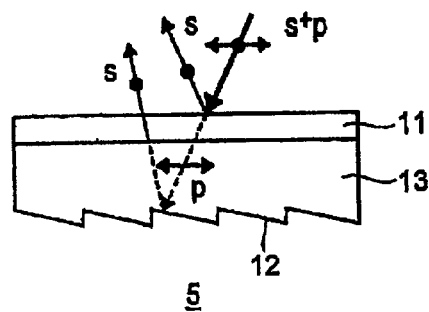
FIG. 8 is a cross section view schematically showing the structure of a fifth embodiment of the polarization conversion element, and the principle of polarization conversion.

A polarization conversion element 4 of a fourth embodiment shown in FIG. 7 has the diffraction grating 12 formed directly on the surface of the quarter-wavelength plate 13, and omits the member 12a. A polarization conversion element 5 of a fifth embodiment shown in FIG. 8 has a dielectric multilayer film 11 formed on the surface of a quarter-wavelength plate 13, and has a diffraction grating 12 formed on the surface of a quarter-wavelength plate 13, and omits the substrate 14 and member 12a.

Figure 9:
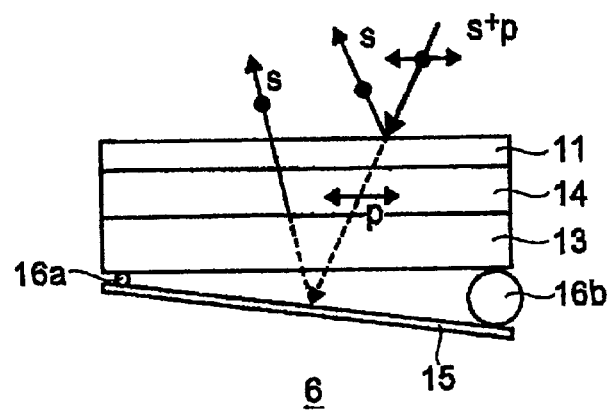
FIG. 9 is a cross section view schematically showing the structure of a sixth embodiment of the polarization conversion element, and the principle of polarization conversion.
Figure 10:
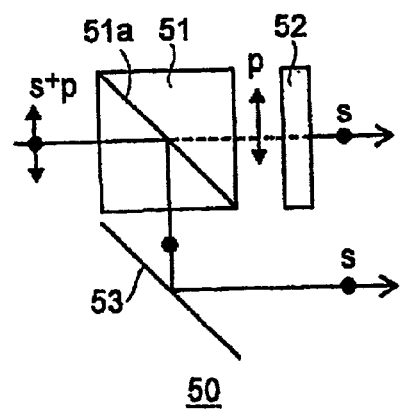
FIG. 10 is a cross section view schematically showing the structure of a conventional polarization conversion element, and the principle of polarization conversion.
Figure 11:
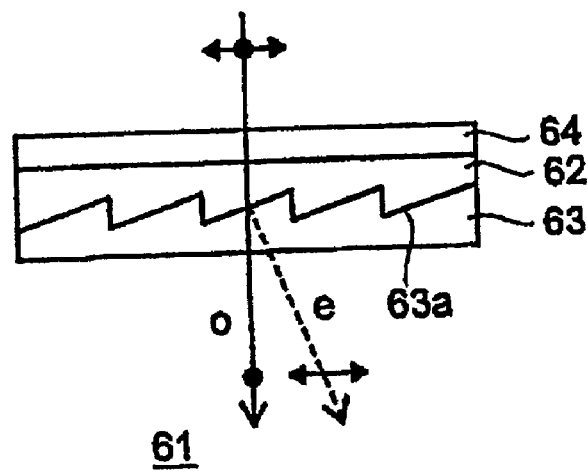
FIG. 11 is a cross section view schematically showing the structure of a conventional polarization conversion element, and the principle of polarization conversion.
Figure 12:
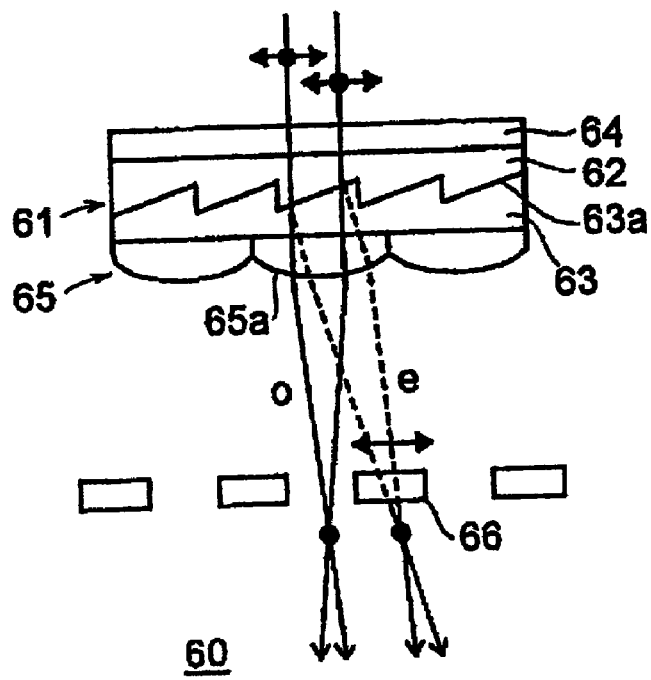
FIG. 12 is a cross section view schematically showing the structure of a conventional polarization conversion optical system provided with the polarization conversion element of FIG. 11, and the principle of polarization conversion.

In the polarization conversion elements 1~5 above, light transmitted through the dielectric multilayer film 11 is reflected by the diffraction grating 12. However, a reflection-type diffraction grating using a hologram, or a simple mirror without a diffraction grating also may be used. The structure of a polarization conversion element 6 of a sixth embodiment wherein light transmitted through the dielectric multilayer film 11 is reflected by a mirror is shown schematically in FIG. 9.

The polarization conversion element 6 is provided with a planar mirror 15 in place of the member 12a on which is formed the diffraction grating 12 of the polarization conversion element 1. Since the mirror 15 provides regular reflection, when the mirror 15 is arranged parallel to the dielectric multilayer film 11, there is no difference in the previously mentioned incidence angle A and incidence angle B. In this case two spacers 16a and 16b having different thicknesses at their peripheries are interposed between the quarter-wavelength plate 13 and the mirror 15, so as to incline the mirror 15 relative to the dielectric multilayer film 11. The inclination angle can be adjusted by the thickness of the spacers 16a and 16b, and the gap between the spacers 16a and 16b can be finely adjusted.

The polarization conversion element 6 uses an extremely simple mirror, and realizes a lower cost element than the polarization conversion elements 1~5 which use diffraction gratings. Furthermore, since the thickness is not uniform, and the thickness increases as the beam diameter of the conversion target light becomes larger, the use of a diffraction grating may be advantageous from the perspective of compactness.

Although examples of the polarization conversion element have been described in each of the embodiments, the polarization conversion optical system of the present invention is not necessarily a single element, and various structural elements may be independent elements. When structural elements are independent elements, angular adjustment of the reflecting element, i.e., diffraction grating, and the mirror relative to the dielectric multilayer film becomes necessary, but if the structural elements are integrated beforehand as a single element, the adjustment is unnecessary, and the element is easy to use.

The polarization conversion optical system of the present invention is a compact optical system which renders both the size of the conversion target light beam in the direction along the beam and the size in a direction perpendicular to the beam to be approximately the diameter of the beam. Moreover, manufacturing is simple since there are few structural elements. In addition, the system is inexpensive because expensive optical elements are not required.

When a diffraction grating is used as a reflecting element, it is possible to arrange the reflecting element parallel to the dielectric multilayer film, making it extremely easy to set the positional relationship of both.

When the dielectric multilayer film is set such that the transmittance of the first polarized light component and the reflectivity of a second polarized light component at a first incident angle are both 99% or higher, and the transmittance of the second polarized light component at a second incidence angle is 95% or higher, loss is greatly suppressed, and the light is not contaminated by polarized light components having different planes of polarization, whatever the polarization state of the light. When the difference in the first incidence angle and the second incidence angle is 30° or less, the converted light can be easily managed by other optical elements and optical systems.

The polarization conversion element of the present invention is a thin element, and its thickness need not be increased however large may be the beam diameter of the conversion target light. Furthermore, the element is extremely easy to use since the dielectric multilayer film and the diffraction element are fixed, and their angles require no adjustment.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A polarization conversion optical system for converting light having a nonuniform plane of polarization to light having a uniform plane of polarization, comprising:
    a dielectric multilayer film having a different incidence angle dependency relative to a first polarized light component and a second polarized light component which have mutually intersecting planes of polarization, wherein the dielectric multilayer film is configured to transmit light of the first polarized light component at a first incidence angle, reflect light of the second polarized light component at the first incidence angle, and transmit light of the second polarized light component at a second incidence angle different from the first incidence angle;
    a reflecting element configured such that light entering the dielectric multilayer film at said first incidence angle and transmitted through the dielectric multilayer film is reflected from the reflecting element so as to impinge the dielectric multilayer film at an angle equal in magnitude to said second incidence angle; and
    a quarter-wavelength plate positioned medially to the dielectric multilayer film and the reflecting element,
    wherein, for incident light impinging on the dielectric multilayer film at the first incidence angle and comprising light having a first polarization direction and light having a second polarization direction:
    light of the first polarization direction incident on the dielectric multilayer film at the first incidence angle is transmitted through the dielectric multilayer film,
    light of the second polarization direction incident on the dielectric multilayer film at the first incidence angle is reflected from the dielectric multilayer film,
    the transmitted light of the first polarization direction is reflected at the reflecting element and is converted to converted light having the second polarization direction by passing through the quarter-wavelength plate twice, and
    the converted light having the second polarization direction is transmitted through the dielectric multilayer film at the second incidence angle,
    such that the reflected light of the second polarization direction and the converted light having the second polarization direction emerge from a same side of dielectric multilayer film.

2. The polarization conversion optical system claimed in claim 1, wherein the reflecting element is a reflecting-type diffraction element.

3. The polarization conversion optical system claimed in claim 1, wherein the transmittance of the first polarized light component at the first incidence angle of the dielectric multilayer film is 99% or higher, and the reflectivity of the second polarized light component at the first incidence angle is 99% or higher, and the transmittance of the second polarized light component at the second incidence angle is 95% or higher.

4. The polarization conversion optical system claimed in claim 1, wherein the difference between the first incidence angle and the second incidence angle is 30° or less.

5. The polarization conversion optical system of claim 1, wherein said dielectric multilayer film comprises alternating layers of a first material containing $SiO_2$ and a second material containing $TiO_2$ and $La_2O_3$.

6. A polarization conversion element comprising:
    a dielectric multilayer film having a different incidence angle dependency relative to a first polarized light component and a second polarized light component which have mutually intersecting planes of polarization, wherein the dielectric multilayer film is configured to transmit light of the first polarized light component at a first incidence angle, reflect light of the second polarized light component at the first incidence angle, and transmit light of the second polarized light component at a second incidence angle different from the first incidence angle;
    a reflecting-type diffraction element configured such that light entering the dielectric multilayer film at the first incidence angle and transmitted through the dielectric multilayer film is reflected from the reflecting-type diffraction element so as to impinge the dielectric multilayer film at an angle equal in magnitude to the second incidence angle; and
    a quarter-wavelength plate positioned between the dielectric multilayer film and the diffraction element,
    wherein the dielectric multilayer film, quarter-wavelength plate, and diffraction element are integral with one another, and
    wherein, for incident light impinging on the dielectric multilayer film at the first incidence angle and comprising light having a first polarization direction and light having a second polarization direction:
    light of the first polarization direction incident on the dielectric multilayer film at the first incidence angle is transmitted through the dielectric multilayer film, light of the second polarization direction incident on the dielectric multilayer film at the first incidence angle is reflected from the dielectric multilayer film, the transmitted light of the first polarization direction is reflected at the reflecting-type diffraction element and is converted to converted light having the second polarization direction by passing through the quarter-wavelength plate twice, and the converted light having the second polarization direction is transmitted through the dielectric multilayer film at the second incidence angle, such that the reflected light of the second polarization direction and the converted light having the second polarization direction emerge from a same side of dielectric multilayer film.

7. The polarization conversion element claimed in claim 6, further including a substrate disposed between the dielectric multilayer film and the diffraction element.

8. The polarization conversion element claimed in claim 6, wherein the diffraction element is formed on a surface of the quarter-wavelength plate, and the surface of the quarter-wavelength plate functions as the diffraction element.

9. The polarization conversion optical system of claim 6, wherein said dielectric multilayer film comprises alternating layers of a first material containing $SiO_2$ and a second material containing $TiO_2$ and $La_2O_3$.

10. A polarization conversion optical system, comprising:
a dielectric multilayer film configured to reflect light of one polarization component at a first angle of incidence, transmit light of another polarization component at said first angle of incidence, and transmit light of said one polarization component at a second angle of incidence different from the first angle of incidence;
a quarter-wavelength plate that transmits light passing through said multilayer film; and
a reflector disposed at a side of said quarter-wavelength plate opposite said multilayer film configured such that light passing through said film and said quarter-wavelength plate at said first angle of incidence is reflected from the reflector back through said quarter-wavelength plate and said film at an angle equal in magnitude to said second angle of incidence,
wherein, for incident light impinging on the dielectric multilayer film at the first angle of incidence and comprising light having a first polarization direction and light having a second polarization direction:
light of the first polarization direction incident on the dielectric multilayer film at the first angle of incidence is transmitted through the dielectric multilayer film,
light of the second polarization direction incident on the dielectric multilayer film at the first angle of incidence is reflected from the dielectric multilayer film,
the transmitted light of the first polarization direction is reflected at the reflector and is converted to converted light having the second polarization direction by passing through the quarter-wavelength plate twice, and
the converted light having the second polarization direction is transmitted through the dielectric multilayer film at the second angle of incidence,
such that the reflected light of the second polarization direction and the converted light having the second polarization direction emerge from a same side of dielectric multilayer film.

11. The polarization conversion optical system of claim 10, wherein said reflector comprises a diffraction grating.

12. The polarization conversion optical system of claim 11, wherein said diffraction grating is integrally formed on said opposite side of said quarter-wavelength plate.

13. The polarization conversion system of claim 11, wherein said diffraction grating is formed in an element that is distinct from said quarter-wavelength plate.

14. The polarization conversion system of claim 10, wherein said reflector is a planar mirror.

15. The polarization conversion optical system of claim 10, wherein said dielectric multilayer film comprises alternating layers of a first material containing $SiO_2$ and a second material containing $TiO_2$ and $La_2O_3$.

16. The polarization conversion optical system claimed in claim 1, wherein the dielectric multilayer film and the quarter-wavelength plate are mutually parallel.

17. The polarization conversion optical system claimed in claim 6, wherein the dielectric multilayer film and the quarter-wavelength plate are mutually parallel.

18. The polarization conversion optical system claimed in claim 10, wherein the dielectric multilayer film and the quarter-wavelength plate are mutually parallel.

* * * * *